United States Patent [19]

Burek et al.

[11] Patent Number: 5,598,499
[45] Date of Patent: Jan. 28, 1997

[54] SEAL FOR CABLE SPLICE CLOSURE

[75] Inventors: Denis E. Burek, Cumming; Marc D. Jones, Lithonia, both of Ga.

[73] Assignee: Lucent Technologies, Inc., Murray Hill, N.J.

[21] Appl. No.: 548,359

[22] Filed: Nov. 1, 1995

[51] Int. Cl.[6] ...................................................... G02B 6/00
[52] U.S. Cl. ........................................... 385/138; 385/147
[58] Field of Search ................................... 385/138, 139, 385/147; 174/77 R, 91, 92, 93; 439/610, 98

[56] References Cited

U.S. PATENT DOCUMENTS

| | | | |
|---|---|---|---|
| 3,728,467 | 4/1973 | Klayum | 174/38 |
| 3,769,443 | 10/1973 | Pierzchala et al. | 174/38 |
| 3,963,320 | 6/1976 | Spinner | 439/584 |
| 4,267,401 | 5/1981 | Wilkinson | 174/77 R |
| 4,701,574 | 10/1987 | Shimirak et al. | 174/93 |
| 4,942,270 | 7/1990 | Gamarra | 174/93 |
| 5,267,878 | 12/1993 | Shinji et al. | 439/610 |
| 5,495,138 | 2/1996 | Behr et al. | 313/318.01 |

*Primary Examiner*—Akm E. Ullah

[57] ABSTRACT

A seal for use in an optical closure is formed in the general shape of a truncated cone. The seal has an aperture which extends completely through the conical shape portion of the seal and which terminates within a plug located at the larger end of the seal. A sinusoidal shaped slit is formed completely through the seal from the small end of the seal to a small distance away from the large end of the seal. The seal is placed within an angled section of a port within an optical closure and an end cap is screwed into the port thereby forcing the seal further into the angled section. The seal can be used for both sealing ports which receive optical cables and ports which do not receive any cables. For the ports that do receive an optical cable, the plug is removed from the seal and the slit is extended all he way to the rear of the seal. When the optical cable is passed through the slit into the aperture of the seal, portions of the seal on either side of the slit become separated from each other.

30 Claims, 6 Drawing Sheets

5,598,499

SEAL FOR CABLE SPLICE CLOSURE

FIELD OF THE INVENTION

This invention relates to a seal and, more particularly to a seal for use with an optical cable splice closure.

BACKGROUND OF THE INVENTION

A typical optical cable splice closure has a number of ports for receiving fiber optic cables. After being passed into a port, a fiber optic cable is mechanically secured to the closure, has its outer plastic and metallic sheath removed, and has its core tube, which encase the optical fibers, split and routed to one or more splice trays inside protective tubes. Within the splice trays, the optical fibers are removed from their respective protective tubes and are spliced to other fibers. The optical splice closure usually can accommodate a number of splice trays, with each splice tray holding a number of splices. For protection of the optical fibers which are exposed within the closure, the closure generally has a number of components for sealing it from the outside environment.

In a widely used prior art lightguide closure, which will be discussed more fully hereinafter, sealing is achieved by means of a grommet disposed between the flanges of upper and lower halves of a two part closure shell, with the two halves being clamped together. The closure thus formed has openings at each end through which the cables are introduced into the interior of the closure. Each end of the grommet has inner and outer bored blocks adapted to receive and embrace the cables which are anchored in cable grips mounted adjacent to the cable seals just inside the closure. The placing of each cable within its respective bore is facilitated by means of a longitudinal slit within the block over each bore so that the bore can be opened up sufficiently to receive the cable or grommet plug and, when released, tightly embrace them. In those cases where a bore does not receive a cable, it must be independently sealed by means of, for example, a solid grommet plug. In addition, where a cable is to be passed straight through the closure without splicing, it is sometimes necessary to have slits formed in the cable embracing grommet to facilitate locating the cable within the inner and outer bored blocks of the grommet.

The splice closures of the prior art are generally designed to accommodate a range of cable diameters, however, they require that the installer or splicer carry a corresponding range of grommets, each having different size bores, both split and unsplit. The grommets are, themselves, somewhat expensive to manufacture because of their generally unique configuration. It has been the accepted practice to produce them by casting them in an open mold process out of polyurethane, which is a relatively expensive and time consuming process.

SUMMARY OF THE INVENTION

The present invention, in a preferred embodiment thereof, is a seal for providing a seal between a cable and a tapered port in a closure. The seal has a conical shaped outer surface, and has a base defining a rear end of the seal and a truncated top defining a front end of the seal. An aperture extends completely through the seal from the front end to the rear end and defines a conically shaped inner surface having a base at the front end of the seal and a truncated top near the rear end of the seal. A slit extends completely through the seal from the outer surface to the inner surface thereof and extends from the front end toward the rear end of the seal. When the seal is compressed from the rear end toward the front end of the seal, the outer surface of the seal engages the tapered port, the inner surface of the seal engages the cable, and portions of the seal on either side of the slit are forced together, as will be more fully discussed hereinafter.

Preferably, the seal of the invention is injection molded from a thermoplastic elastomer and can seal cables having a range of diameters. The slit in the seal has a generally sinusoidal shape along its length which assists in the recombination of the seal on either side of the slit as the seal is being compressed from the rear end.

In another aspect of the invention, the seal is formed with a plug on the rear end of the seal and has the aperture terminating within the plug. The seal formed with the plug can be used to seal any tapered port which does not receive any cables. If the tapered port does receive a cable, then the plug is removed from the rear end whereby the aperture in the seal extends completely through the seal from the front end to the rear end thereof. The cable is then passed through the slit into the aperture of the seal. Thus, a single seal according to the invention can be used to seal either ports that receive cables or ports which do not receive any cables.

With a seal according to the invention, the installer or splicer can use a single seal for a wide range of cable diameters. The seal according to the invention can also be used with ports that do not receive any optical cables. Consequently, the number of different seals or grommets that the installer or splicer must stock can be significantly reduced.

The principles and features of the present invention will be more readily apparent and understood from the following detailed description, read in conjunction with the accompanying drawings.

DETAILED DESCRIPTION

Figure 1:
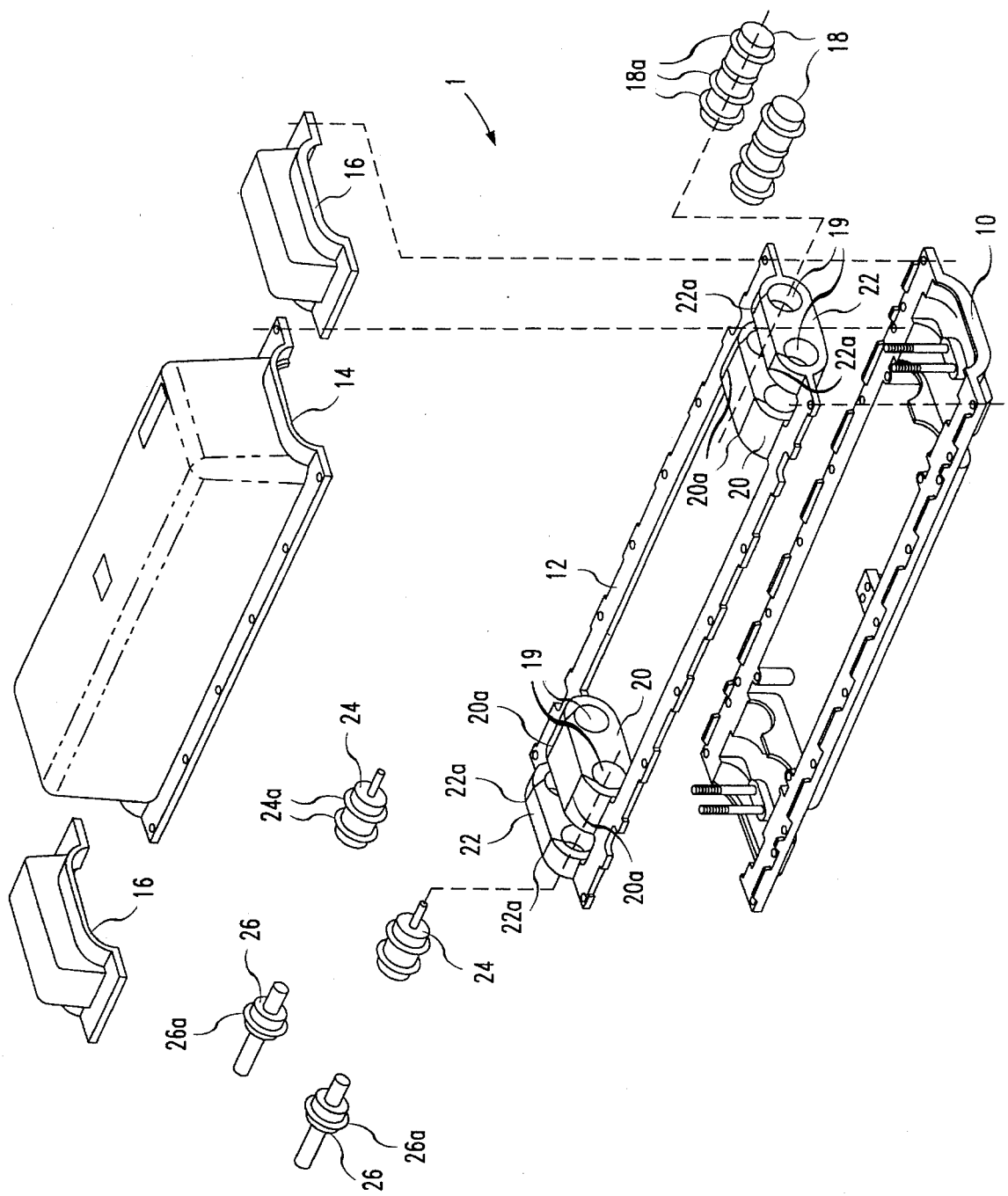
FIG. 1 is a partial view of a conventional optical closure with a set of sealing components.

FIG. 1 illustrates an example of the sealing components used with a UCB2 Universal Lightguide Closure™ 1 manufactured by AT&T. The optical closure 1 comprises a base 10, a cover 14, a grommet or gasket 12, and clamps 16. The grommet 12 is placed on top of the base 10 with side edges of the grommet 12 being disposed over side edges of the base 10. When the cover 14 and clamps 16 are mounted on top of the base 10 with the grommet 12 therebetween, the grommet 12 seals the sides of the optical closure 1 from the outside environment.

The grommet 12 has an inner block 20 and an outer block 22 disposed at both ends and each set of inner and outer blocks 20 and 22 has a pair of apertures 19 for collectively defining four ports providing access to the interior of the optical closure 1. In order for an optical cable to pass into the optical closure 1 through one of the apertures 19, the blocks 20 and 22 are formed with slits 20a and 22a, respectively, which permit an installer or lineman to widen the bores in the blocks sufficiently to receive the cable therein.

Although the optical closure 1 can receive up to four optical cables, the optical closure 1 frequently receives less than four cables, such as only two cables as shown in FIG. 1. To seal a port which does not receive an optical cable, a long grommet plug 18 is inserted into the apertures 19 of both the inner and outer blocks 20 and 22 for that port. The grommets 18 have ridges 18a formed on an outer surface which mate with grooves (not shown) in the blocks 20 and 22. When the cover 14 and clamps 16 are mounted to the base 10, the grommet 12 is compressed against the long grommet plug 18 to seal the port from the outside environment.

An inner grommet 24 and an outer grommet 26 are used to seal each port that does receive an optical cable. As with the long grommet plug 18, the inner and outer grommets 24 and 26 have ridges 24a and 26a, respectively, which assist in sealing the grommets 24 and 26 to the blocks 20 and 22, respectively, when the cover 14 and clamps 16 are secured to the base 10. Each grommet 24 or 26 is cylindrically shaped and is bored through the center for the passage of an optical cable. The center of each of the grommets 24 and 26 is formed with a number of protrusions, similar to an O-ring, for contacting an inserted optical cable and for providing a seal between the grommet 24 or 26 and the optical cable. The grommets 24 and 26 therefore seal the ends of the optical closure 1 while permitting the passage of optical cables into the closure 1.

The installer or lineman must have in stock grommets 24 and 26 that are formed with slits into the center of the grommets 24 and 26 as well as grommets 24 and 26 without any slits. The grommets 24 and 26 with slits are necessary since some optical cables have fibers which pass completely through the closure 1 without being spliced to another fiber. With these cables, the installer or lineman must attach the grommets 24 and 26 to the cables by sliding the optical cables through the slits and into the centers of the grommets 24 and 26.

For the cables that have all of their fibers cut for splicing, the grommets 24 and 26 can be attached to an optical cable by passing the cable through the centers of the grommets 24 and 26. It is preferable to use grommets 24 and 26 which are not formed with slits since this type of grommet provides a better seal between the grommet 12 and the optical cable. The installer or lineman must therefore maintain a supply of both split grommets 24 and 26 and grommets 24 and 26 without any splits.

The optical closure 1 is a "universal" optical closure 1 since it can accommodate fiber optic cables having a range of diameters. Since the inside diameter of the grommets 24 and 26 and the inner protrusions in the grommets 24 and 26 are designed for a specific cable diameter, separate sets of grommets 24 and 26 must be manufactured for each diameter of optical cable. Thus, in addition to supplying both split and non-split grommets 24 and 26, the installer or lineman must further supply grommets 24 and 26 for each diameter of fiber optic cable.

Figure 2A:
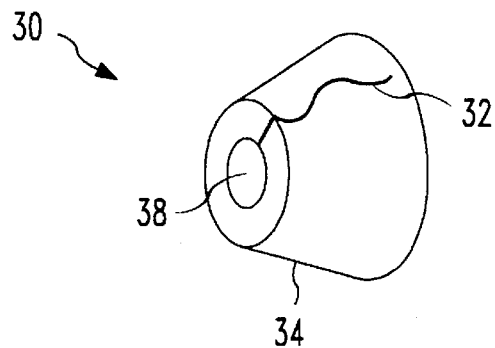
FIGS. 2(A, (B) and (C) are perspective, top, and end views, respectively, of a seal according to a preferred embodiment of the invention.
Figure 2B:
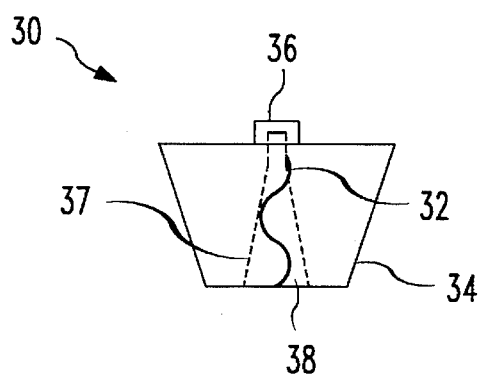
Figure 2C:
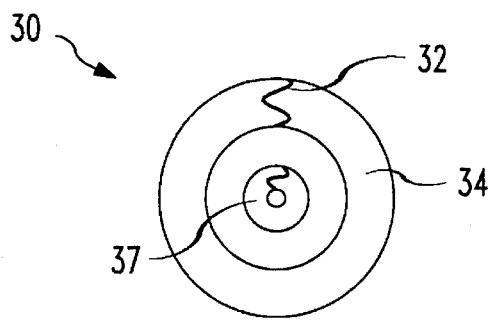

With reference no FIGS. 2(A), (B), and (C), a seal 30 according to a preferred embodiment of the invention is formed in the general shape of a truncated cone. The seal 30 has an outer surface 34, which defines the generally conical shape of the seal 30, and has a plug 36 formed at a rear end of the seal 30. An aperture 38 extends completely through the conical portion of the seal 30 and terminates within the plug 36. An inner surface 37 of the seal 30 defines a generally conical shaped space within the seal 30 which is inverted relative to the conical shape of the seal 30.

The seal 30 also has a slit 32 which extends from the outer surface 34 completely through to the inner surface 37 of the seal 30. The slit 32 begins at the front end of the seal 30 and terminates a distance from the rear end of the surface 34. The slit 32 is formed in a wavelike pattern and generally resembles a sinusoidal waveform. The exact shape of the slit 32 is not critical to the invention but preferably is a wave pattern defining at least one arcuate protrusion and a corresponding arcuate depression.

The seal 30 is injection molded or compression molded formed from a thermoplastic elastomer, such as Santoprene™. The use of a thermoplastic elastomer renders the seal 30 very resilient whereby the seal 30 can be separated along the slit 32. Additionally, the use of a thermoplastic elastomer permits the compression of the seal 30 along both its length and width.

Figure 3A:
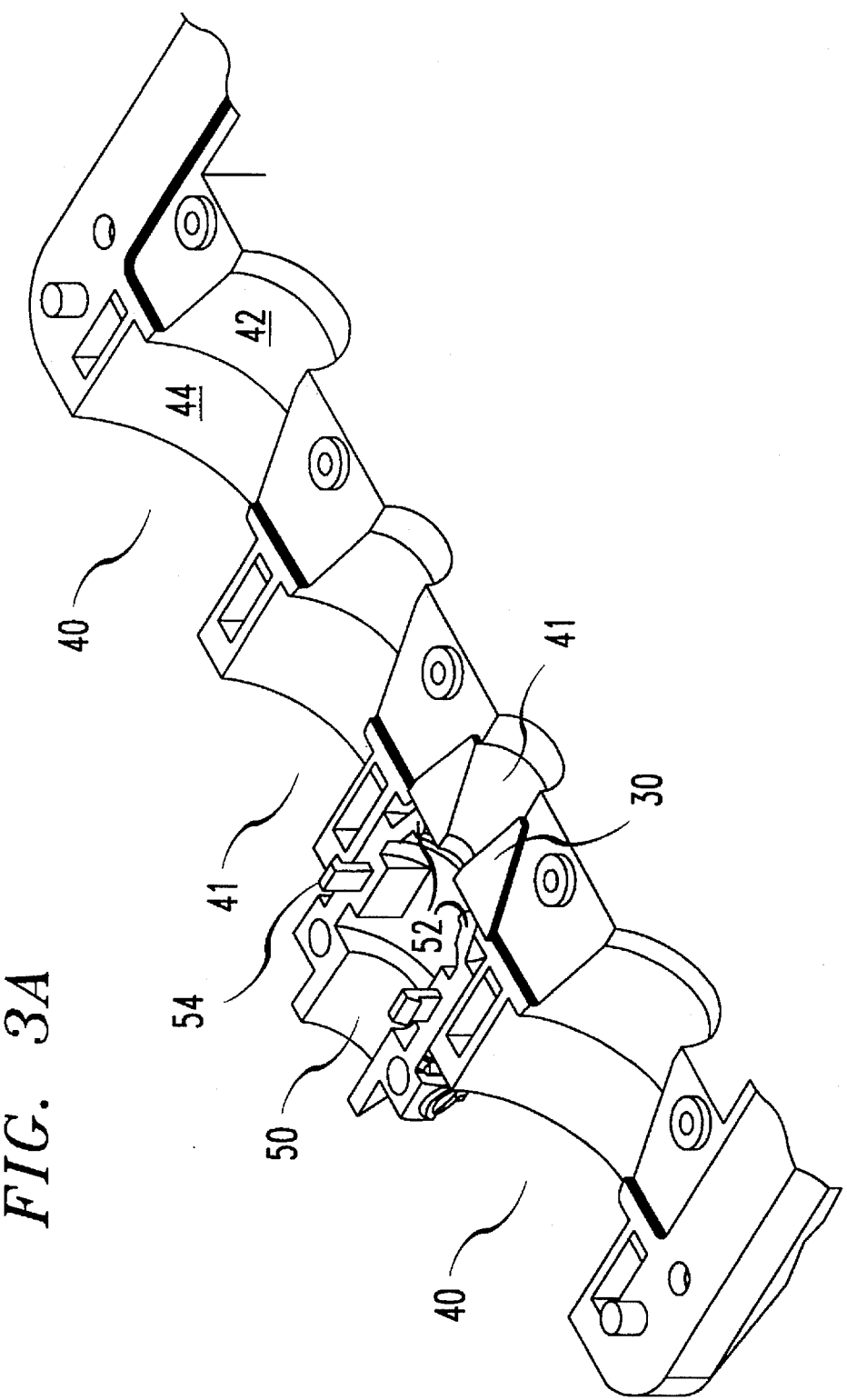
FIGS. 3(A), (B), and ( re perspective, top, and side views of a bottom half of an end of an optical closure with the seal of FIGS. 2(A), (B),and (C) in place therein.

FIGS. 3(A), (B), and (C) illustrate the seal 30 within an optical closure having outer ports 40 and inner ports 41. Each port 40 or 41 has an angled section 42 for receiving one of the seals 30 and a threaded section 44 for receiving an end cap 50. While only the bottom halves of the optical closure, seal 30, and end cap 50 have been illustrated in FIGS. 3(A), (B), and (C), the appearance and functioning of the upper halves of the optical closure, seal 30, and end cap 50 should be apparent to one skilled in the art and, accordingly, will not be described in any further detail.

Figure 3B:
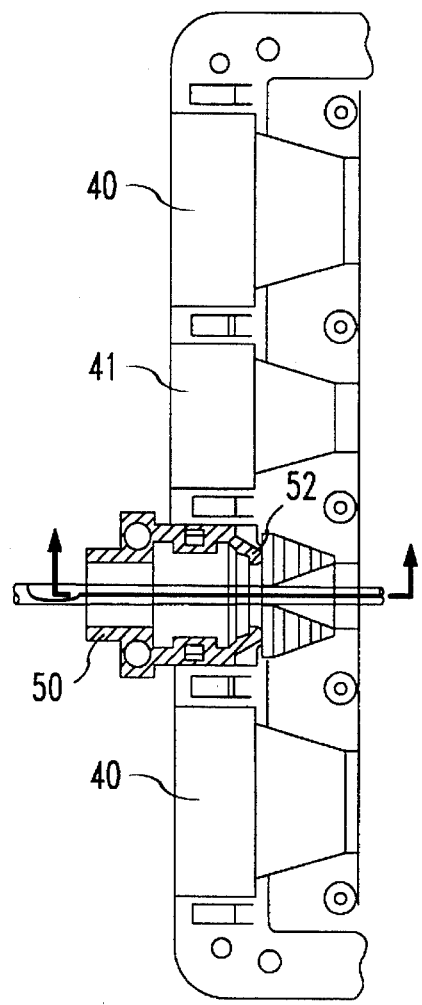
Figure 3C:
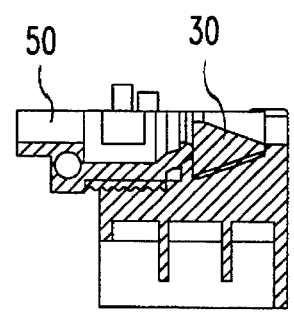

To seal an optical cable, such as cable 58 shown in FIG. 3(B), the plug 36 of the seal 30 is removed from the seal 30 so that the aperture 38 extends completely from the front to the rear of the seal 30. Next, the seal 30 is separated along its slit 32 until the slit 32 is extended all the way to the rear of the seal 30. The slit 32 may be extended in other ways, such as by cutting along the seal 30 from the end of the slit 32 to the rear end of the seal 30. With the slit 32 extending completely from the front to the rear of the seal 30, the optical cable 58 is passed through the slit 32 and into the aperture 38 of the seal 30.

The seal 30 can accommodate a wide range of cable diameters. For the dimensions of the seal 30 shown in FIGS. 2(A), (B), and (C), the seal 30 can accommodate optical cables having diameters at least in the range of 0.25 of an inch to 1 inch. Since the diameter of the aperture 38 is approximately 0.150 of an inch at the rear end of the seal 30, the rear end of the seal 30 cannot extend completely around the optical cable 58. Consequently, the seal 30 will be separated along the slit 32 at least near the rear end of the seal 30 and the angle of the surface 34 will be increased. To better accommodate this increase in angle size, the angle of the section 42 is selected to be greater than the angle of the surface 34 on the seal 30, preferably by about 3 degrees.

After the optical cable 58 has been passed through the aperture 38 of the seal 30, the seal 30 is placed into the port 41 of the optical closure front end first so that the rear of the seal 30 is exposed to the outside of the optical closure. When the end cap 50 is threaded into the section 44 of the optical closure, the end 52 of the cap 50 forces the seal 30 further into the angled section 42. As the seal 30 is forced into the angled section 42, the seal 30 is compressed along its length by the end cap 50 on one end and the small width of the port 41 on the other end of the seal 30. The seal 30 is also compressed across its width since the end cap 50 forces the seal 30 into an area having a smaller diameter. The diameter at the base of the aperture 38 is larger than the diameter of the cable 58 whereby the seal 30 is easily compressed even though the other end of seal 30 may be held open by the cable 58.

The compression of the seal 30 along its length and width causes the seal 30 to seal the space between the optical closure and the optical cable 58. The compression of the seal 30 from the end by the cap 50 forces the portions of the seal 30 that had been separated along the slit 32 to recombine. The sinusoidal shape of the slit 32 assists in this recombination by guiding the protrusions on one side of the seal 30 into corresponding depressions on the other side of the seal 30. By closing the seal 30 along the slit 32, the seal 30 prevents moisture, dirt, or other contaminants from entering the optical closure.

Figure 4A:
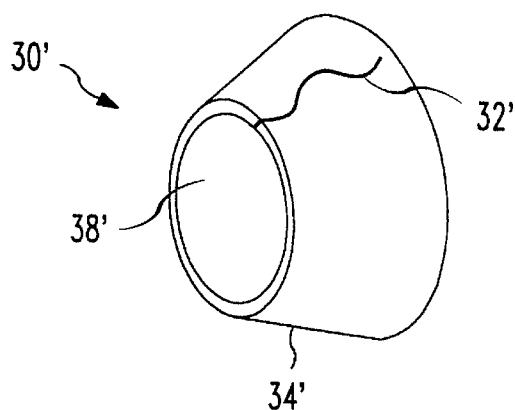
FIGS. 4(A), (B) and (C) are perspective, top, and end views, respectively, of a seal according to a second embodiment of the invention.
Figure 4B:
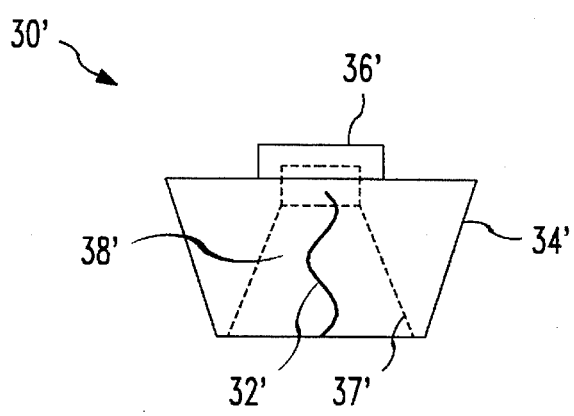
Figure 4C:
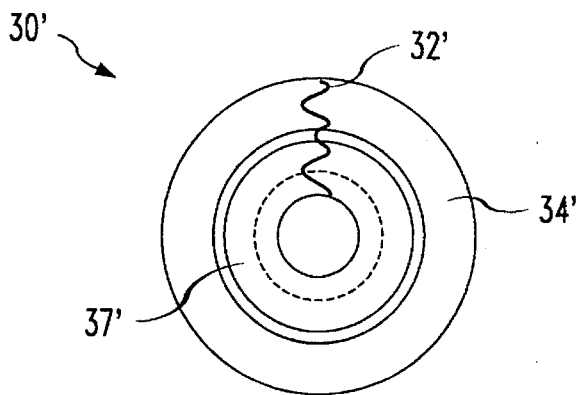

A second embodiment of a seal 30' is shown in FIGS. 4(A), (B), and (C). The seal 30' differs from the seal 30 in that it can accommodate optical cables with larger diameters, such as diameters in the range of 0.8 of an inch to 1.5 inches. The seal 30', however, is similar to seal 30 in that it has a slit 32', an angled outer surface 34', a plug 36', an inner surface 37', and an aperture 38'. The seal 30' is received within ports 40 of the optical closure, which are larger than the ports 41. The operation of the seal 30' is apparent from the description of seal 30 and will therefore be omitted.

Figure 5A:
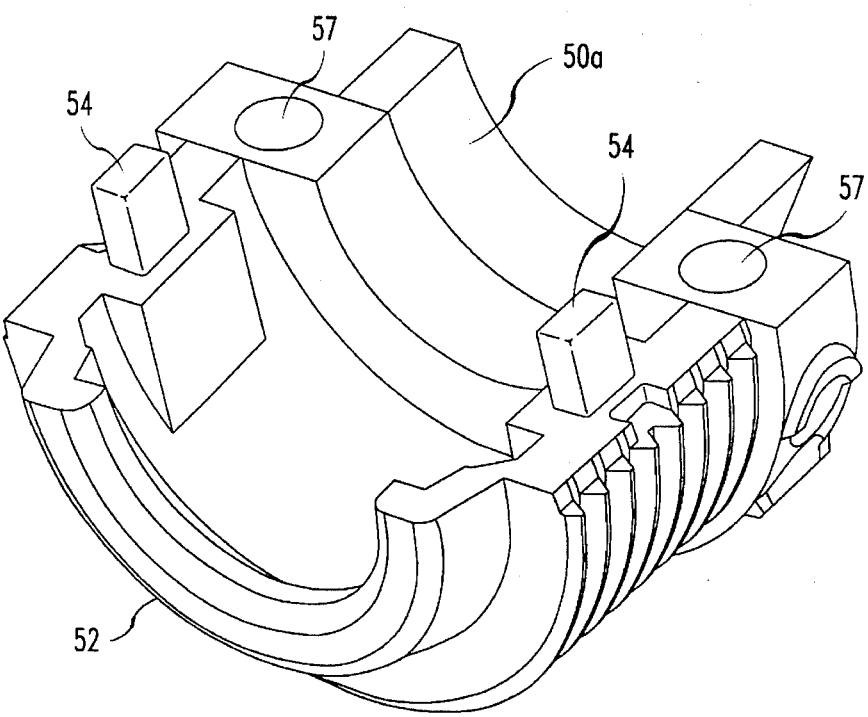
FIGS. 5(A) and (B) are perspective views of bottom and top halves, respectively, of an end cap.
Figure 5B:
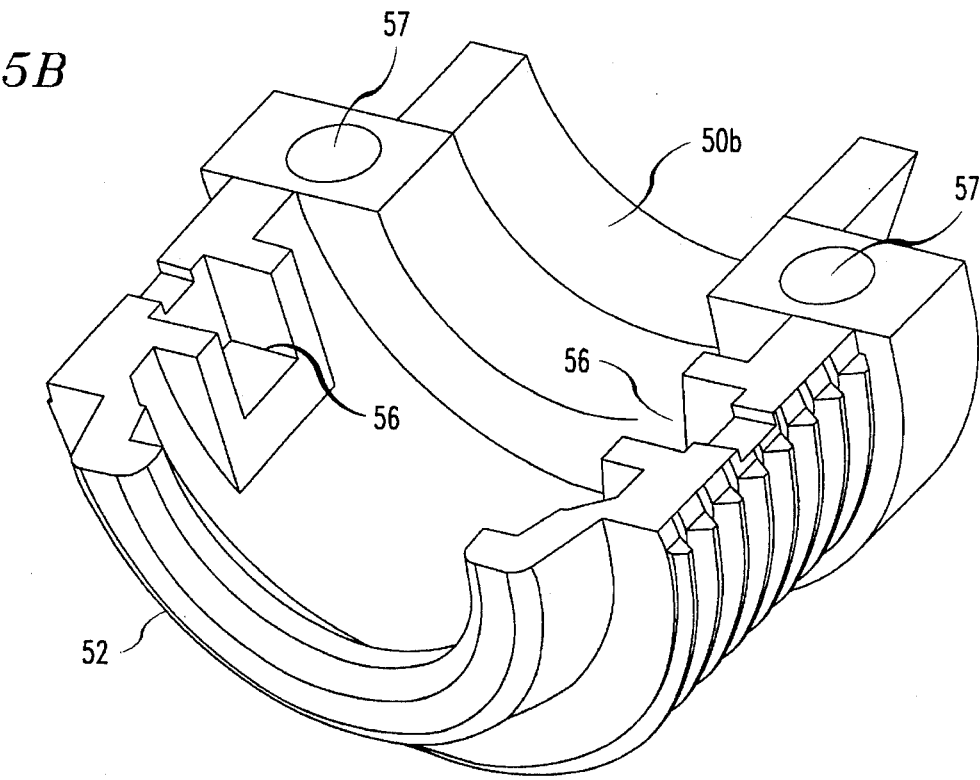

In order to pass the cable 58 through the cap 50, the cap 50 is formed in two halves 50a and 50b which may be separated from each other. A lower half 50a is disclosed in FIG. 5(A) while an upper half 50b is shown in FIG. 5(B). The two halves 50a and 50b of the cap 50 are joined together by inserting the protrusions 54 on half 50a into cavities 56 in the other half 50b. Each of the halves 50a and 50b also has apertures 57 so that a screwdriver may be used to tighten the assembled cap as it is threaded into threaded section 44. As will be apparent to those skilled in the art, the two halves 50a and 50b of the cap 52 may be formed in various other ways.

The foregoing has been illustrative of the features and principles of the present invention. Various changes or modifications to the invention may be apparent to workers in the art without departure from the spirit and scope of the invention.

We claim:

1. A seal for providing a seal between a cable and a port in a closure, comprising:

a conical shaped outer surface having a first base and a first truncated top, said first base defining a rear end of said seal and said first truncated top defining a front end of said seal;

an aperture extending completely through said seal from said front end to said rear end, said aperture defining a conical shaped inner surface of said seal with said conical shaped inner surface having a second base at said front end and a second truncated top located near said rear end of said seal; and a slit extending completely through said seal from said outer surface to said inner surface and extending from said front end of said seal toward said rear end of said seal;

wherein said outer surface of said seal is for engaging said port, said inner surface of said seal is for engaging said cable, and portions of said seal on either side of said slit are forced together when said seal is compressed from said rear end toward said front end, whereby said port in said closure is sealed.

2. The seal as set forth in claim 1, wherein said slit terminates a distance from said rear end.

3. The seal as set forth in claim 1, wherein said slit extends completely from said front end of said seal to said rear end of said seal.

4. The seal as set forth in claim 1, wherein said slit is shaped to define at least one arcuate protrusion on one side of said slit and one arcuate depression on an opposite side of said slit.

5. The seal as set forth in claim 4, wherein said one arcuate depression is for guiding said one arcuate protrusion closer to a mating relationship with said one arcuate depression as said seal is compressed from said rear end toward said front end.

6. The seal as set forth in claim 1, wherein said slit has a sinusoidal shape.

7. The seal as set forth in claim 1, wherein a diameter of said second truncated top is less than a diameter of said cable.

8. The seal as set forth in claim 1, wherein a diameter of said second base is greater than a diameter of said cable.

9. The seal as set forth in claim 1, wherein said seal seals any cable within a range of cable diameters.

10. The seal as set forth in claim 1, wherein said seal comprises a thermoplastic elastomer.

11. The seal as set forth in claim 1, wherein said seal is injection molded.

12. The seal as set forth in claim 1, wherein said seal is compression molded.

13. The seal as set forth in claim 1, wherein said cable comprises an optical cable and said closure comprises an optical closure.

14. A seal for sealing a port in a closure, comprising:

a conical shaped outer surface having a first base and a first truncated top, said first base defining a rear end of said seal and said first truncated top defining a front end of said seal;

a plug protruding from said rear end of said seal;

an aperture extending from said front end of said seal toward said rear end and terminating within said plug, said aperture defining a conical shaped inner surface of said seal with said conical shaped inner surface having a second base at said front end and a second truncated top located near said rear end; and a slit extending completely through said seal from said outer surface to said inner surface and extending from said front end of said seal toward said first base of said conical shaped outer surface;

wherein said outer surface is for engaging and for sealing said port in said closure.

15. The seal as set forth in claim 14, wherein said slit defines at least one arcuate protrusion and at least one arcuate depression.

16. The seal as set forth in claim 14, wherein said slit has a sinusoidal shape.

17. The seal as set forth in claim 14, wherein said plug is for being removed so that said aperture extends completely through said seal from said front end to said rear of said seal and so that a cable may be inserted into said aperture.

18. The seal as set forth in claim 17, wherein a diameter of said second truncated top is less than a diameter of said cable.

19. The seal as set forth in claim 14, wherein a diameter of said second base is greater than a diameter of said cable.

20. The seal as set forth in claim 17, wherein said seal seals any cable within a range of cable diameters.

21. The seal as set forth in claim 14, wherein said cable comprises an optical cable and said closure comprises an optical closure.

22. The seal as set forth in claim 1, wherein said seal comprises a thermoplastic elastomer.

23. The seal as set forth in claim 14, wherein said seal is injection molded.

24. The seal as set forth in claim 14, wherein said seal is compression molded.

25. A method of sealing a port of a closure with a seal having a conical shaped outer surface with a first base and a first truncated top, said first base defining a rear end of said seal and said first truncated top defining a front end of said seal; a plug protruding from said rear end of said seal; an aperture extending from said front end of said seal toward said rear end and terminating within said plug, said aperture defining a conical shaped inner surface of said seal with said conical shaped inner surface having a second base at said front end and a second truncated top located near said rear end; and a slit extending completely through said seal from said outer surface to said inner surface and extending from said front end toward said rear end of said seal, said method comprising the steps of:

removing said plug from said rear end;

finish slit by cutting grommet;

passing said cable through said slit and into said aperture of said seal, a diameter of said cable being greater than a diameter of said second truncated top whereby portions of said seal are separated from each other along said slit;

inserting said seal into said port with said cable passing through said aperture; and compressing said seal from said rear end to said front end whereby said outer surface engages said port, said inner surface engages said cable, and said portions of said seal that had been separated along said slit are forced together.

26. The method as set forth in claim 25, wherein said slit terminates a distance from said rear end of said seal and said method further comprises the step of extending said slit across said distance so that said slit extends completely from said front end to said rear end of said seal.

27. An optical splice closure, comprising:

an optical port having tapered walls in a shape of a truncated cone and having a threaded cylindrical-shaped wall disposed at an end of said tapered walls that corresponds to a base of said truncated cone;

a seal for sealing between an optical cable and said tapered walls of said optical port, said seal having:
a conical shaped outer surface for mating with said tapered walls of said optical port;
an aperture extending completely through a length of said seal and defining a conical shaped inner surface; and
a slit extending completely from said outer surface to said inner surface of said seal and defining an arcuate protrusion on one side of said slit and a corresponding arcuate depression on an opposite side of said slit;
said aperture having a diameter equal to or less than a diameter of said cable so that portions of said seal on either side of said slit separate when said seal is placed around said cable; and a cylindrical cap having threads on an outer surface for mating with said threaded wall of said optical closure and having an end for contacting an end of said seal, said cap for compressing said seal from said end of said seal as said cap is threaded into said threaded wall of said optical closure and also for causing said arcuate protrusion to mate with said arcuate depression of said seal.

28. A closure having an aperture for receiving a cable, comprising:

a first section defining an initial outer portion of said aperture and having threaded walls for receiving an end cap; and a second section defining an inner portion of said aperture and having walls tapered in a shape of a truncated cone with a base of said truncated cone being adjacent to said first section, said second section of said closure adapted to receive a seal for sealing between said cable and said tapered walls;

wherein said threaded walls of said first section advances said end cap into said aperture with rotation of said end cap forcing said seal further into said second section and sealing between said seal and said second section.

29. The closure as set forth in claim 28, wherein said end cap is comprised of a first member, a second member, and means for joining said first member to said second member, said cable being inserted between said first member and said second member.

30. The closure as set forth in claim 28, wherein said seal comprises:

a conical shaped outer surface for mating with said tapered walls of said aperture;

an aperture extending completely through a length of said seal and defining a conical shaped inner surface; and a slit extending completely from said outer surface to said inner surface of said seal and defining an arcuate protrusion on one side of said slit and a corresponding arcuate depression on an opposite side of said slit;

said aperture having a diameter equal to or less than a diameter of said cable so that portions of said seal on either side of said slit separate when said seal is placed around said cable, said portions mating together when said end cap forces said seal into said aperture.

\* \* \* \* \*